No. 639,138. Patented Dec. 12, 1899.
R. H. BERKSTRESSER.
COMBINED CULTIVATOR AND WEEDER.
(Application filed June 6, 1899.)

(No Model.) 2 Sheets—Sheet 1.

Witnesses
Jas. H. Blackwood
Clara G. Cooper

Inventor
Robert H. Berkstresser
By L. Deane & Son
Attorneys

No. 639,138. Patented Dec. 12, 1899.
R. H. BERKSTRESSER.
COMBINED CULTIVATOR AND WEEDER.
(Application filed June 6, 1899.)

(No Model.) 2 Sheets—Sheet 2.

Witnesses
Jas. H. Blackwood
Clara D. Cooper

Inventor
Robert H. Berkstresser
By L. Deane & Son
Attorneys

THE NORRIS PETERS CO., PHOTO-LITHO., WASHINGTON, D. C.

UNITED STATES PATENT OFFICE.

ROBERT H. BERKSTRESSER, OF YORK, PENNSYLVANIA.

COMBINED CULTIVATOR AND WEEDER.

SPECIFICATION forming part of Letters Patent No. 639,138, dated December 12, 1899.

Application filed June 6, 1899. Serial No. 719,560. (No model.)

*To all whom it may concern:*

Be it known that I, ROBERT H. BERKSTRESSER, a citizen of the United States, residing at York, in the county of York and State of Pennsylvania, have invented certain new and useful Improvements in a Combined Cultivator and Weeder, of which the following is a specification, reference being had therein to the accompanying drawings.

My invention relates to a combined cultivator and weeder of the class which is adapted to work at the same time on opposite sides of a planted row; and the primary object of the invention is to provide improved means for adjusting the sections of the cultivator laterally to increase or diminish its width.

A further important characteristic of the invention is that I provide the forward beam of each side section of the machine with curved flattened cultivator-teeth and the rear beams of each side section with thin teeth or fingers, which operate as weeders.

The construction of the improvement will be fully described hereinafter, and its novel features defined in the appended claims, in connection with the accompanying drawings, which form a part of this specification.

Figure 1:
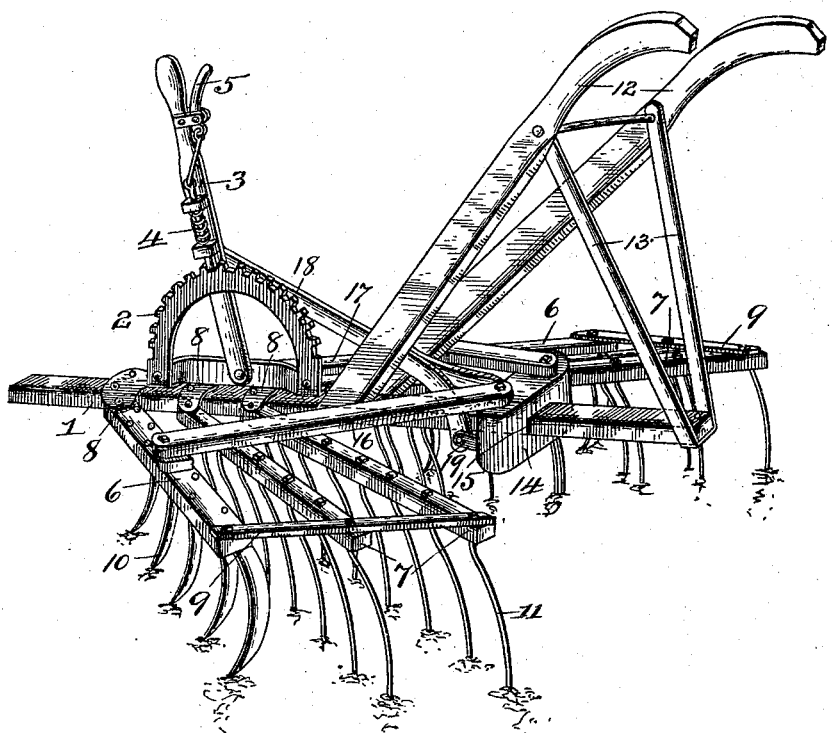
Figure 2:
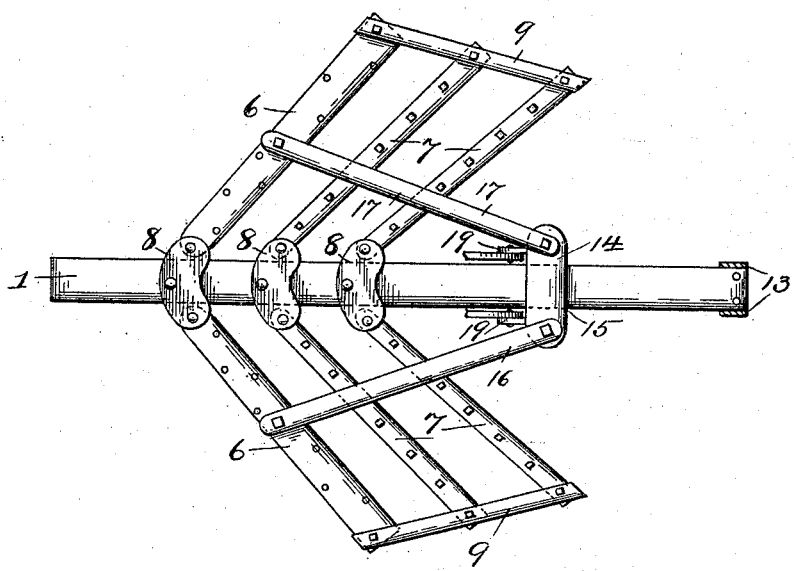
Figure 3:
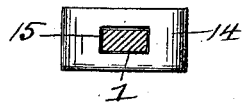

In the drawings, Figure 1 is a perspective view of a combined cultivator and weeder embodying the invention, and Fig. 2 is a plan view of the same. Fig. 3 is a detail view of sliding block.

The reference-numeral 1 designates the central beam of the machine, upon which is secured a toothed quadrant 2.

3 designates a lever fulcrumed upon the beam 1 centrally with relation to the quadrant and having the usual spring-dog 4 connected pivotally to a hand-lever 5. The dog 4, as shown, is adapted to engage the notches of the quadrant to lock the lever 3 in its various adjustments, as is well understood in this class of machines.

Each side section comprises a front bar 6 and one or more bars 7 in rear of the bar 6, the inner ends of said bars being pivotally secured to the sides of the central beam 1 by any suitable brackets 8. The outer ends of the bars 6 and 7 of each side section are loosely connected by a connecting-bar 9, so that said bars will move together, by the mechanism hereinafter described. The front bar 6 of each section is provided with curved or spirally-twisted teeth 10 and the rear bars 7 are provided with weeder-fingers 11.

The handles 12 of the machine are secured at their lower ends to the beam 1, and their upper ends are braced to the rear end of said beam 1 by bracket-arms 13, as clearly shown in Fig. 1. Upon the beam 1, between the lower ends of the handles and the bracket-arms 13, is arranged a sliding block 14, provided with an opening 15, through which the beam extends. This block 14 is connected, by diverging bars 16 and 17, to the front bars 6 of each side section and by means of a rod 18 with the operating-lever 3. The rod 18 is pivotally secured at its forward end to the lever 3, and the rear end of said rod 18 extends between the handles 12 and is forked or bifurcated to adapt it to be secured to eyes 19, projecting from the front of the sliding block 14. The diverging bars 16 and 17 have a loose pivotal connection with the block 14 and also with the front bars 6 of each section to permit a free movement of the bars of each section upon their pivotal supports.

The operation of the machine constructed as above described will be readily understood. When the lever 3 is thrown forward, the block 14 is also pulled forward, thus expanding the bars 6 and 7 in their relation to the beam 1 to increase the working width of the sections, while by drawing the lever backward the block 14 is forced backward, pulling the bars 6 and 7 rearward through the medium of the connecting-bars 16 and 17 and reducing the width of the machine.

It will be apparent that the lever 3 may be locked at any adjustment by means of the dog 4 and notched quadrant and that the machine may be readily adjusted either while moving or when at rest.

The cultivator-teeth upon the front bars 6 operate to loosen and agitate the soil, while the weeder-fingers following behind said cultivator-teeth pick up the weeds dislodged by the front teeth.

I claim—

1. In a combined cultivator and weeder, the combination with a main central beam, of side sections each comprising a plurality of bars pivotally secured at their inner ends to the central bar, and loosely connected at their outer ends by bars 9; a block adapted to slide on the central beam, and connected to the side sections by diverging bars, pivotally secured at their ends to said block and side sections; an operating-lever fulcrumed above the central beam; and a rod pivotally secured at one end to the lever and bifurcated at its rear end where it is pivotally secured to the sliding block.

2. In a combined cultivator and weeder, the combination with a central beam and diverging handles secured thereto, of bracket-arms connecting the handles with the rear end of the beam; a block adapted to slide on the central beam and provided with brackets at its front side; a lever fulcrumed above the central beam; a bifurcated rod connecting the lever with the brackets of the sliding block; side bars pivotally secured at their inner ends to the central beam, and loosely connected at their outer ends by bars 9; and diverging bars 16 pivotally secured at their rear ends to the sliding block, and at their forward ends to the front side bars.

In testimony whereof I affix my signature in presence of two witnesses.

ROBERT H. BERKSTRESSER.

Witnesses:
 HENRY E. COOPER,
 R. W. F. OGILVIE.